US006503429B1

(12) United States Patent
Linville et al.

(10) Patent No.: US 6,503,429 B1
(45) Date of Patent: Jan. 7, 2003

(54) CASKET LID AND METHOD OF MAKING SAME

(75) Inventors: John E. Linville, Louisville, KY (US); Donald R. Maier, Cincinnati, OH (US); Patrick M. Saaf, Batesville, IN (US)

(73) Assignee: Batesville Services, Inc., Batesville, IN (US)

( * ) Notice: Subject to any disclaimer, the term of this patent is extended or adjusted under 35 U.S.C. 154(b) by 0 days.

(21) Appl. No.: 09/457,163

(22) Filed: Dec. 8, 1999

Related U.S. Application Data

(63) Continuation-in-part of application No. 09/153,626, filed on Sep. 15, 1998, now Pat. No. 6,243,931.

(51) Int. Cl.$^{7}$ ........................ A61G 17/00; B29C 43/02; B29C 43/18

(52) U.S. Cl. ........................... 264/112; 264/109; 27/14; 27/16

(58) Field of Search ................................ 264/299, 319, 264/109, 112, 119; 27/14, 16

(56) References Cited

U.S. PATENT DOCUMENTS

| | | | |
|---|---|---|---|
| 925,929 | A | 6/1909 | Magoris |
| 1,234,180 | A | 7/1917 | Kersten |
| 1,507,957 | A | 9/1924 | Edwards |
| 1,578,652 | A | 3/1926 | Fisher |
| 1,730,666 | A | 10/1929 | Listing |
| 1,903,197 | A | 3/1933 | Scott |
| 2,338,035 | A | 12/1943 | Gerold |
| 2,494,473 | A | 1/1950 | Dowling |
| 2,664,615 | A | 1/1954 | Hillenbrand et al. |
| 3,146,285 | A | 8/1964 | Munk |
| 3,164,880 | A | 1/1965 | Hotchkiss |
| 3,166,617 | A | 1/1965 | Munk |
| 3,220,080 | A | 11/1965 | Connelly |
| 3,261,897 | A | 7/1966 | Munk |
| 3,283,052 | A | 11/1966 | Munk |
| 3,354,248 | A | 11/1967 | Haas et al. |
| 3,406,229 | A | 10/1968 | Cenegy |
| 3,423,267 | A | 1/1969 | Munk |
| 3,490,114 | A | 1/1970 | Connelly et al. |
| 3,574,906 | A | 4/1971 | Rittenhouse |
| 3,590,428 | A | 7/1971 | Munk et al. |
| 3,663,137 | A | 5/1972 | Haas et al. |
| 3,697,208 | A | 10/1972 | Munk et al. |

(List continued on next page.)

FOREIGN PATENT DOCUMENTS

| | | |
|---|---|---|
| EP | 0 466 653 A1 | 1/1992 |
| GB | 2 114 498 A | 8/1983 |
| NL | 6 516 139 A | 6/1967 |

*Primary Examiner*—Mary Lynn Theisen
(74) *Attorney, Agent, or Firm*—Wood, Herron & Evans, L.L.P.

(57) ABSTRACT

A method of making a one-piece, unitary lid for a casket comprises providing tooling configured to produce a casket lid having a crown, a pie, a rim and a header, providing settable material, preferably a mixture of wood chips arid binder, from which to mold the lid, molding the settable material with the tooling and permitting the settable material to set. The tooling transmits a wood grain pattern into the settable material. The wood grain pattern of the lid is continuous when viewed rotated 180° about an axis perpendicular to the plane defined by the lid, located medially of the transverse extent of the lid and coinciding with the header end edge of the lid. Thus two such caps placed end-to-end have a continuous wood grain pattern extending from the head end of the casket to the foot end of the casket. Resin impregnated tissue paper is applied to the settable material prior to molding. The resin impregnated tissue paper conforms to the wood grain and conceals the wood chips.

6 Claims, 4 Drawing Sheets

U.S. PATENT DOCUMENTS

| | | | |
|---|---|---|---|
| 3,720,738 | A | 3/1973 | Munk |
| 3,726,954 | A | 4/1973 | Munk et al. |
| 3,729,786 | A | 5/1973 | Walding |
| 3,762,974 | A | 10/1973 | Wirz |
| 3,764,645 | A | 10/1973 | Munk |
| 3,781,948 | A | 1/1974 | Pitt |
| 3,809,736 | A | 5/1974 | Munk |
| 3,954,376 | A | 5/1976 | Munk |
| 3,969,798 | A | 7/1976 | Sahlin |
| 3,975,127 | A | 8/1976 | Munk et al. |
| 3,997,643 | A | 12/1976 | Munk et al. |
| 4,029,023 | A | 6/1977 | Rosewicz et al. |
| 4,034,447 | A | 7/1977 | Kollmann et al. |
| 4,041,582 | A | 8/1977 | MacDonald |
| 4,065,898 | A | 1/1978 | Munk |
| 4,104,348 | A | 8/1978 | Munk et al. |
| 4,115,490 | A | 9/1978 | Munk |
| 4,123,831 | A | 11/1978 | Covington |
| 4,151,630 | A | 5/1979 | Havey |
| 4,153,490 | A | 5/1979 | Werz et al. |
| 4,156,956 | A | 6/1979 | Partridge et al. |
| 4,167,232 | A | 9/1979 | Munk et al. |
| 4,176,431 | A | 12/1979 | Havey, III |
| 4,209,880 | A | 7/1980 | Lidholm |
| 4,214,861 | A | 7/1980 | Munk et al. |
| 4,225,545 | A | 9/1980 | Munk et al. |
| 4,318,351 | A | 3/1982 | Munk |
| 4,399,596 | A | 8/1983 | Parlour et al. |
| 4,497,662 | A | 2/1985 | Chisholm et al. |
| 4,504,347 | A | 3/1985 | Munk et al. |
| 4,544,342 | A | 10/1985 | Werz et al. |
| 4,544,344 | A | 10/1985 | Munk |
| 4,550,832 | A | 11/1985 | Traumuller et al. |
| 4,550,847 | A | 11/1985 | Traumuller et al. |
| 4,552,797 | A | 11/1985 | Munk et al. |
| 4,610,900 | A | 9/1986 | Nishibori |
| 4,622,190 | A | 11/1986 | Schultz |
| 4,629,594 | A | 12/1986 | Munk |
| 4,730,370 | A | 3/1988 | Elder |
| 4,773,134 | A | 9/1988 | Kay |
| 4,775,312 | A | 10/1988 | Werz et al. |
| 4,867,670 | A | 9/1989 | Munk |
| 4,967,455 | A | 11/1990 | Elder |
| 4,977,930 | A | 12/1990 | Munk et al. |
| 4,990,040 | A | 2/1991 | Nulle et al. |
| 5,001,068 | A | 3/1991 | Golombek |
| 5,016,416 | A | 5/1991 | Munk |
| 5,045,262 | A | 9/1991 | Munk |
| 5,078,938 | A | 1/1992 | Munk et al. |
| 5,155,147 | A | 10/1992 | Dietz et al. |
| 5,213,821 | A | 5/1993 | Munk |
| 5,284,546 | A | 2/1994 | Tilby |
| 5,485,661 | A | 1/1996 | McClure |

CASKET LID AND METHOD OF MAKING SAME

RELATED APPLICATIONS

This application is a continuation-in-part application of prior application Ser. No. 09/153,626 filed Sep. 15, 1998, now U.S. Pat. No. 6,243,931, the entire disclosure of which is hereby incorporated by reference herein as if fully set forth in its entirety.

FIELD OF THE INVENTION

This invention relates generally to caskets, and more particularly to a method of making one-piece, unitary lids for caskets by a novel molding process.

BACKGROUND OF THE INVENTION

A casket includes a shell and, in the case of so-called "split top" caskets, a pair of lids or caps, a head end cap and a foot end cap. Caskets have most often been fabricated of either metal or wood for aesthetic reasons. More recently, some lower end caskets have been fabricated out of materials such as plastic, hardboard, and cardboard. While such materials are much less expensive than sheet metal and fine furniture grade wood, there is a consequent decrease in the aesthetics of the casket. Thus, efforts continue to be made by those in the industry to devise more economically produced, less expensive caskets which do not exhibit a consequent decrease in aesthetics and ornamentality.

Each cap in a so-called split top casket is comprised of a crown, a pie, a rim, a header and, in the case of convex shaped lids, a web. More particularly, the crown is, as its name implies, the crown portion of the lid, which is often, though not necessarily, convex in shape. As its name implies, the pie is a pie-shaped section which fits into a pie-shaped cutout in one end of the crown. The crown and pie assembly is typically referred to in the industry as the "cover". The cover thus has opposed sides and opposed ends. Each of the opposed sides has a decorative piece of molding known as a side rim member secured thereto. Similarly, the pie has secured thereto a decorative piece of molding known as an end rim member. The pair of side rim members and the end rim member together comprise the rim. At the end of the cover opposite from the pie, there is attached to the crown a web panel, and there is attached to the ends of the side rim members and to the lower edge of the web a header panel. In the case of flat top casket lids, there is no web, but simply a header. The term "header", as used herein, shall be deemed to encompass both a) a header panel only, and b) a header panel in combination with a web panel. The combined assembly, i.e., crown, pie, rim and header, comprises the casket cap or casket lid.

In order to fabricate a cap, several different pieces must be time-consumingly assembled and secured together. For example, in the case of sheet metal caskets, a number of sheet metal stampings must be fixtured and then welded together to form the cap. In the case of wood caskets, the crown is formed from a plurality of boards secured together lengthwise with glue and fasteners. The pie is likewise formed from a plurality of boards and is secured to the crown with glue and fasteners. Next, the side and end rim members, themselves formed from a plurality of boards, are secured to the cover and the header is secured to the cover and the side rim members, again via glue and fasteners. As can be appreciated, utilizing a combination of glue and fasteners to secure together the various components of a wood casket cap is tedious and time consuming.

It would be desirable to reduce the number of component parts necessary to fabricate a cap thereby reducing assembly time and costs, etc. One attempt at accomplishing this, commercialized by Werzalit AG & Co., Federal Republic of Germany, involved the use of a mixture of wood chips and binder which was molded with tooling into a one-piece cover, i.e. crown and pie assembly. This molded one-piece cover thus eliminated the separate crown and pie and the steps required to secure the two together. The tooling for forming such a one-piece cover comprised a male portion configured into the shape of the under side of the cover to be formed, and a female portion configured into the shape of the upper side of the cover to be formed. However, once this single-piece cover was formed, a manufacturer was still required to fabricate and install separate side rim members, end rim member and header to the one-piece cover in order to complete the cap assembly.

Another less than completely successful attempt at fabricating a one-piece casket cap utilized fiberglass and resin applied to a form in the shape of a casket cap, the process otherwise being known as "laying up." While such a one-piece, integral fiberglass casket cap did include a crown, a pie, side rim members, end rim members and a header, the fiberglass material itself as well as its use created difficulties. For example, the process of laying up of fiberglass is time and labor intensive and does not readily lend itself to automation. Further, the glass fibers are difficult to manage and the resin produces noxious odors.

It would be desirable to eliminate even more of the separate component parts of a casket cap in order to eliminate the costs associated with producing the component parts as well as the costs associated with assembling together all of the component parts, while at the same time avoiding the difficulties associated with fiberglass construction techniques.

SUMMARY OF THE INVENTION

The present invention is a method of making a one-piece, unitary lid for a casket and a casket lid made by the method. The method and lid of this invention completely eliminate the separate component parts required to be assembled together in prior casket lids. The method of the invention comprises providing tooling configured to produce a one-piece, unitary casket lid having a crown, a pie, a rim and a header, providing settable material from which to mold the lid, molding the settable material with the tooling and permitting the settable material to set thereby producing the one-piece, unitary casket lid having a crown, a pie, a rim and a header.

The method preferably further includes molding, with the tooling, a pattern into the settable material, which preferably simulates wood grain. The wood grain pattern applied to the settable material of the crown on one side of a longitudinal axis of symmetry of the lid is preferably continuous with the wood grain pattern applied to the settable material of the crown on the other side of the longitudinal axis of symmetry of the lid, when viewed rotated 180° about an axis perpendicular to the plane defined by the lid, located medially of the transverse extent of the lid and coinciding with the header end edge of the lid. Even more preferably, the wood grain pattern of the crown on one side of the longitudinal axis of symmetry of the lid is that of a portion of the length of a plurality of "full length" boards, i.e. boards which start out as being the length of the head and foot end cap crowns combined, and the wood grain pattern of the crown on the other side of the longitudinal axis of symmetry of the lid is that of the remaining length of the plurality of full length boards, rotated 180° about an axis perpendicular to the plane defined by the lid, located medially of the transverse extent of the lid and coinciding with the header end edge of the lid. Therefore, when two such lids are positioned together atop a casket shell header end-to-header end, the simulated wood grain pattern of the crowns of the lids match thereby creating the visual impression that the crowns of the casket caps are fabricated of so-called full length boards, a feature which is more visually and aesthetically appealing than constructing the head and foot end caps of a casket out of non-full length boards. The settable material is preferably comprised of wood chips and binder.

In another aspect of the invention, a method of making a one-piece, unitary lid for a casket comprises providing tooling configured to produce a one-piece, unitary lid having a crown, a pie, a rim and a header, the tooling having a male portion and a female portion, providing settable material from which to mold the lid, applying the settable material onto either or both of the male and female portions of the tooling, molding the settable material by compressing the settable material between the male and female portions of the tooling, and permitting the settable material to set thereby producing the one-piece, unitary casket lid having a crown, a pie, a rim and a header.

The female portion of the tooling preferably includes a pattern formed therein which, when the female portion of the tooling compresses the settable material onto the male portion of the tooling, transmits the pattern, preferably simulating wood grain, into the settable material. Again, it is preferable for the reasons stated above that the wood grain pattern applied to the settable material of the crown on one side of the longitudinal axis of symmetry of the lid be continuous with the wood grain pattern applied to the settable material of the crown on the other side of the longitudinal axis of symmetry of the lid, and even more so for the wood grain pattern on one side of the axis to be of a portion of the length of a plurality of full length boards while the pattern on the other side of the axis is of the remaining portion of the length of the plurality of full length boards.

The method preferably further includes applying resin impregnated tissue paper onto the settable material after the settable material has been applied to the male portion of the tooling and then compressing the settable material onto the male portion of the tooling with the female portion of the tooling. Thus, when the female portion of the tooling, which includes a pattern formed therein, preferably a wood grain pattern, compresses the settable material and the resin impregnated tissue paper onto the male portion of the tooling, the female portion of the tooling transmits the pattern into the settable material, with the resin impregnated tissue paper forming an outer skin of the casket lid which conforms to the pattern and which conceals the wood chips of the settable material.

In yet another aspect of the invention, a casket lid comprises a crown and a pie at one end of the crown. The crown and pie together comprise a cover having a pair of sides and a pair of ends. A header is positioned at the end of the cover opposite from the pie, a side rim member is positioned at each of the pair of cover sides and an end rim member is positioned at the pie end of the cover. The crown, pie, rim members and header are molded as a one-piece, unitary structure.

The settable material is preferably applied onto the male portion of the tooling. The lid is preferably molded from a settable material of wood chips and binder. The crown, pie, rim members and header preferably include a wood grain pattern formed therein. More preferably, and for the reasons discussed above, the wood grain pattern formed in the crown on one side of the longitudinal axis of symmetry of the lid is continuous with the wood grain pattern formed in the crown on the other side of the longitudinal axis of symmetry of the lid; the wood grain pattern on one side of the axis is even more preferably that of a portion of the length of a plurality of full length boards while the pattern on the other side of the axis is that of the remaining portion of the length of the full length boards. More preferably, resin impregnated tissue paper is applied to the crown, pie, rim members and header which conforms to the wood grain pattern formed therein and which conceals the wood chips of the settable material.

In still another aspect of the present invention, a casket lid comprises a crown having opposed end edges. The crown has a wood grain pattern formed therein. The wood grain pattern in the crown on one side of the longitudinal axis of symmetry of the lid is a continuous with the wood grain pattern in the crown on the other side of the longitudinal axis of symmetry of the lid for the reasons stated above. Preferably, the wood grain pattern on one side of the axis is that of a portion of the length of a plurality of full length boards while the pattern on the other side of the axis is the remaining portion of the length of the full length boards. The casket lid preferably is molded from a settable material of wood chips and binder, and further preferably includes resin impregnated tissue paper applied to the crown which conforms to the wood grain pattern and conceals the wood chips.

The invention thus provides a one-piece, unitary lid for a casket which includes a crown, a pie, a rim and a header. Multiple components are not required to be fabricated or assembled. The lid includes a decorative pattern simulating wood grain. The wood grain of the lid is such that two such lids placed together header-end-to header end as when assembling same onto a casket shell have wood grain patterns which match at the interface thereof and are continuous end-to-end thereby creating the visual effect of the lid being fabricated of boards which initially are the full length of the head and foot end caps combined. The resin impregnated tissue paper which covers the crown, pie, rim and header conceals the wood chips in the settable material and conforms to the wood grain pattern formed therein.

These and other advantages of the present invention will become more readily apparent during the following detailed description taken in conjunction with the drawings herein, in which:

DETAILED DESCRIPTION OF THE INVENTION

Figure 1:
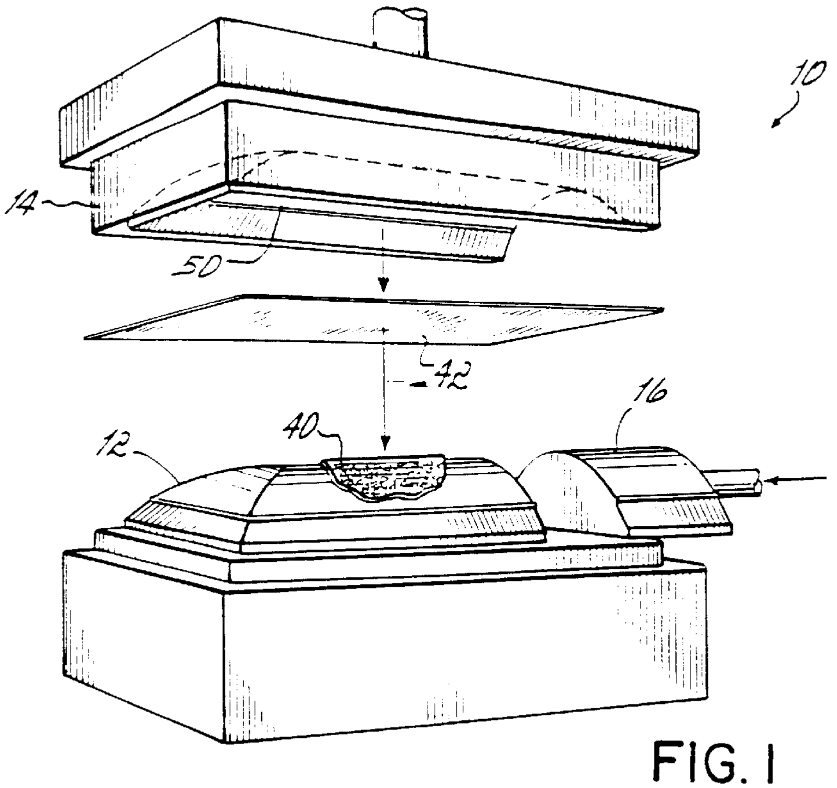
FIG. 1 is a perspective view of the tooling for carrying out the method of the invention, with the tooling illustrated in the open position prior to compressing the resin impregnated tissue paper onto the settable material between male and female portions of the tooling.

Referring first to FIG. 1, there is illustrated tooling 10 which is adapted to make a one-piece, unitary lid for a casket. The tooling 10 comprises a male portion 12 and female portions 14 and 16, the portion 16 essentially being a side ram or press. The tooling 10 is configured to produce a one-piece, unitary casket lid having a crown, a pie, a rim and a header. In particular, the male portion 12 of the tooling 10 is configured to produce the underneath surface of the lid, whereas the female portions of the tooling 14, 16 are configured to produce the exterior surface of the lid.

Figure 4:
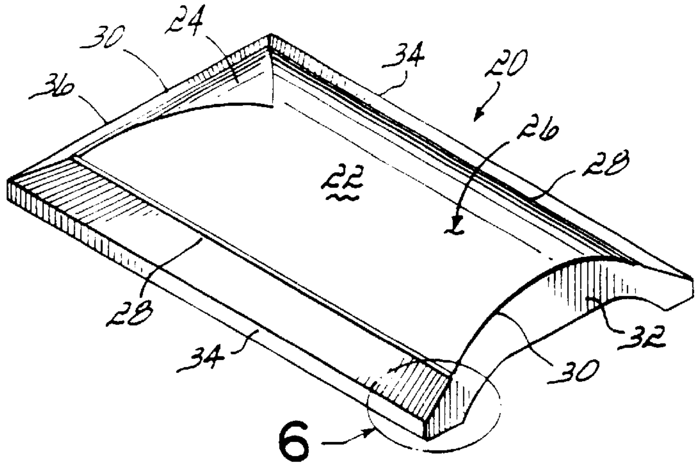
FIG. 4 is a perspective view of a casket lid including crown, pie, rim and header formed with the tooling of FIGS. 1–3.

Referring to FIG. 4, a lid 20 produced by the method of the present invention is illustrated. The lid 20 includes a crown 22 and a pie 24 at one end of the crown 22. The crown 22 and pie 24 together comprise a cover 26 having a pair of opposed sides 28 and a pair of opposed ends 30. A header 32 is positioned at the end 30 opposite from the pie 24. A side rim member 34 is positioned at each side 28 of the cover 22 and an end rim member 36 is positioned at the end 30 of the cover 22 corresponding to the pie 24.

Referring back to FIG. 1, to form such a casket lid 20 with the tooling 10, settable material 40 is first shaken onto the male portion 12 of the tooling 10 with a shaker (not shown) positioned between the male 12 and female 14 portions of the tooling 10. In general the amount of material 40 applied to the tooling 12 is on the order of about 3.5 times the thickness of the finished casket lid at a particular location on the tooling 12. The settable material 40 is comprised of shredded and dried wood chips and a binder. Other fibrous material other than wood chips may be utilized however, such as cane fibers, glass fibers, cottonized or asbestos fibers, etc. The binder is preferably a thermosetting binding material or thermosetting plastic such as melamine, urea formaldehyde or phenolformaldehydrate.

Figure 2:
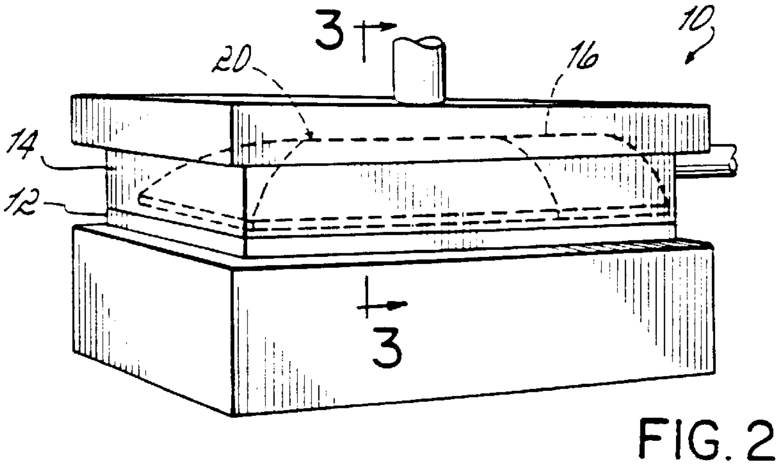
FIG. 2 is a view similar to FIG. 1 except that the mail and female portions of the tooling are illustrated in the closed molding position.

After the exterior surface of the male portion 12 of the tooling is covered with the settable material 40, and referring now to FIG. 2, the female portions of the tooling 14, 16 compress the material 40 onto the tooling 12 so as to mold the material 40 into the desired shape. As used herein, the terms "mold" and "molding" shall embrace the method herein described and illustrated, and equivalents thereof, but shall exclude the process of applying fiberglass and resin to a form known as "laying up". The pressure applied by the tooling 10 on the material 40 is on the order of about 450 tons. The tooling portions 12, 14 and 16 are heated with superheated water flowing therethrough (not shown) such that the tooling 10 is heated to about 165° C. The initial heating and pressing of the material 40 is maintained for about 3 minutes. Shims (not shown) are interposed between the tooling portions 12, 14 and 16 during this initial pressing and heating step and serve as spacers so that the tooling will not overly compress the thickness of the lid 20.

Figure 7:
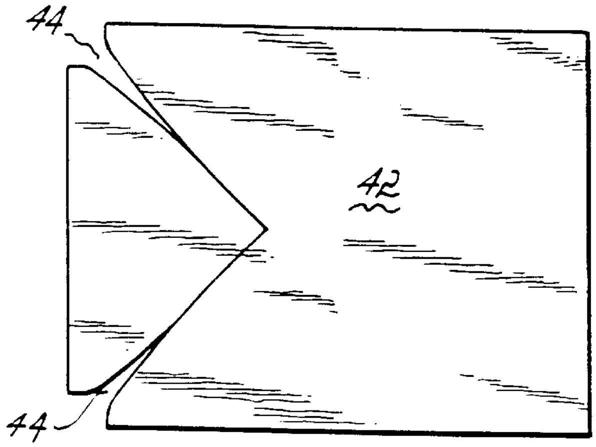
FIG. 7 is a top plan view illustrating the resin impregnated tissue paper with miter cutouts for application to the settable material as per FIG. 1.

After the initial heating and pressing step the tooling 10 is opened and resin impregnated tissue paper 42 is applied onto the settable material 40 (FIG. 1). The paper 42 is preferably 80 gram recycled paper impregnated with 100% melamine. One commercial source for paper of this type is Casco Impregnated Papers, Inc., of Cobourg, Ontario, Canada. As shown in FIG. 7, the paper 42 may include miter cutouts 44 to aid the paper 42 in forming to the material 40 in the area of the pie 24 of the lid 20 to avoid bunching and the like. The female portions 14, 16 of the tooling 10 are then moved back into engagement with the material 40 (this time with the shims removed) to again compress and heat the settable material 40 to further form the lid 20. This subsequent heating and pressing step is performed for about 3 minutes.

Figure 8:
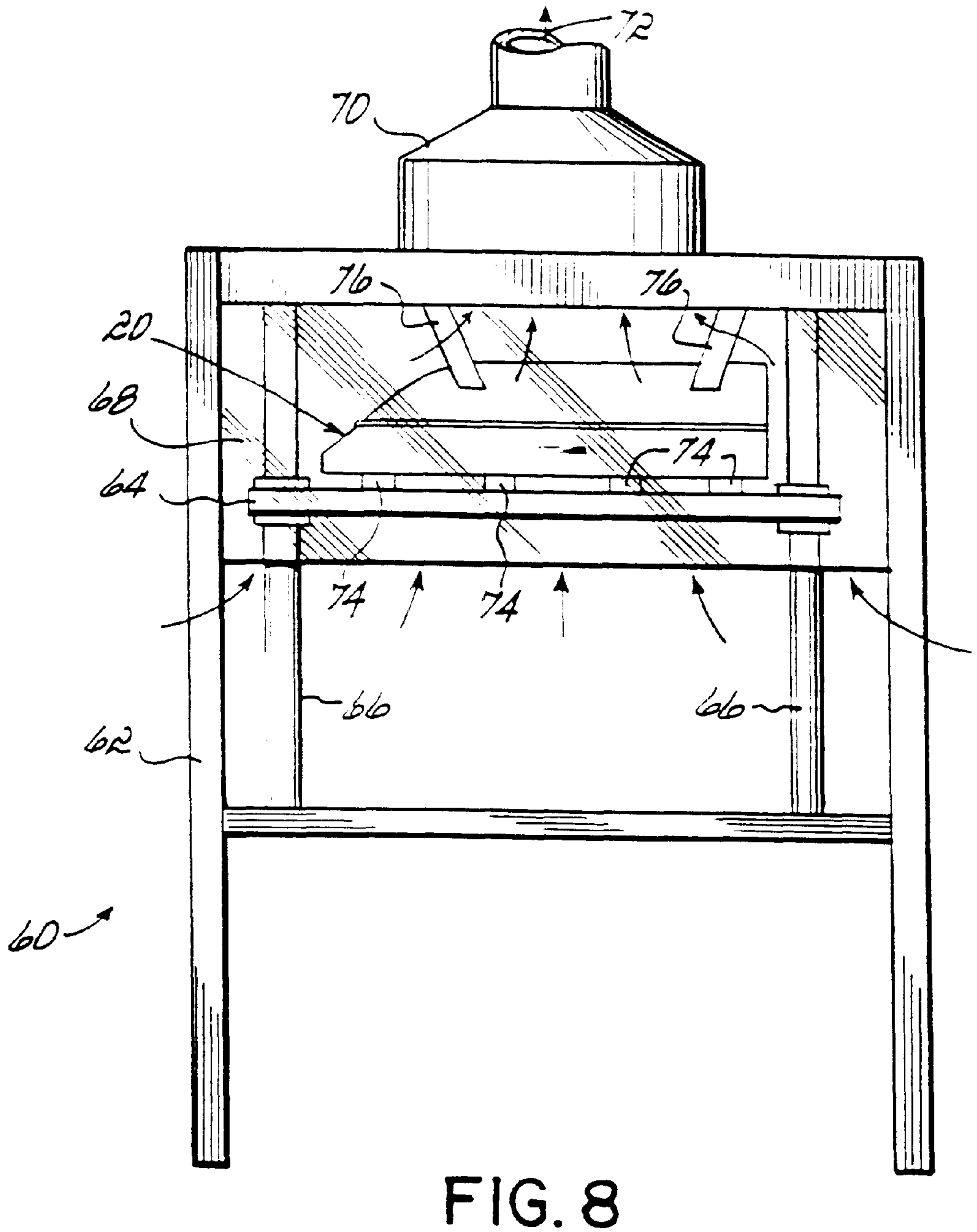
FIG. 8 is a side elevational view of a formed casket lid cooling on a cooling rack.

At the completion of this second heating and pressing step the lid 20 is removed from the tooling 10 and permitted to cool. A cooling stand 60 such as that shown in FIG. 8 may be employed to cool the lid 20. The stand 60 includes a frame 62 including a lid supporting platform 64. Hydraulic or pneumatic cylinders 66 move the platform to a lower position to permit placement of the lid 20 on the platform 64 and to an upper position within a transparent enclosure 68. A fan housing 70 houses a fan (not shown) which pulls ambient air upwardly into the enclosure 68 and around lid 20. The air exhausts at 72. Contoured internal supports 74 support the lid 20. Contoured external supports 76 clamp the lid 20 against the internal supports 74 when the platform 64 is in the upper position, to prevent the lid 20 from warping during cooling.

Figure 3:
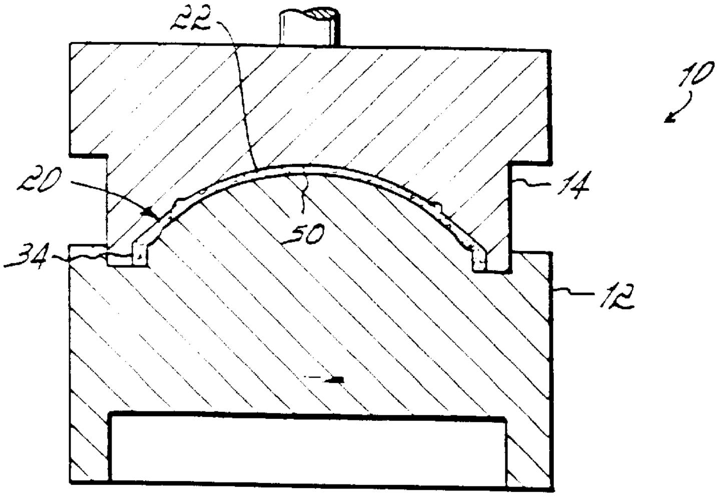
FIG. 3 is a view taken along line 3—3 of FIG. 2.

The underneath side 50 of the female portion 14 of the tooling 10 (FIGS. 1 and 3) preferably includes a pattern formed therein which, when the settable material 40 is pressed thereby, transmits the pattern into the settable material 40. The pattern preferably simulates wood grain.

Figure 5A:
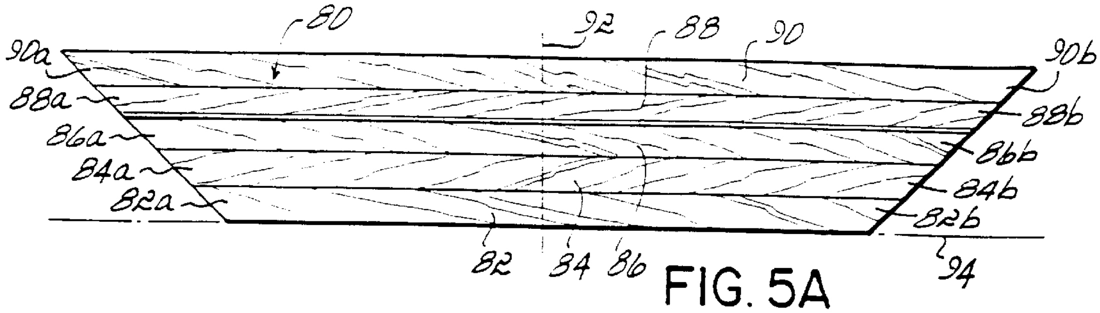
FIGS. 5A–5C illustrate the pattern formed in the casket lid of FIG. 4 by the tooling such that two such lids installed onto a casket shell have the appearance of being constructed from full length boards.
Figure 5B:
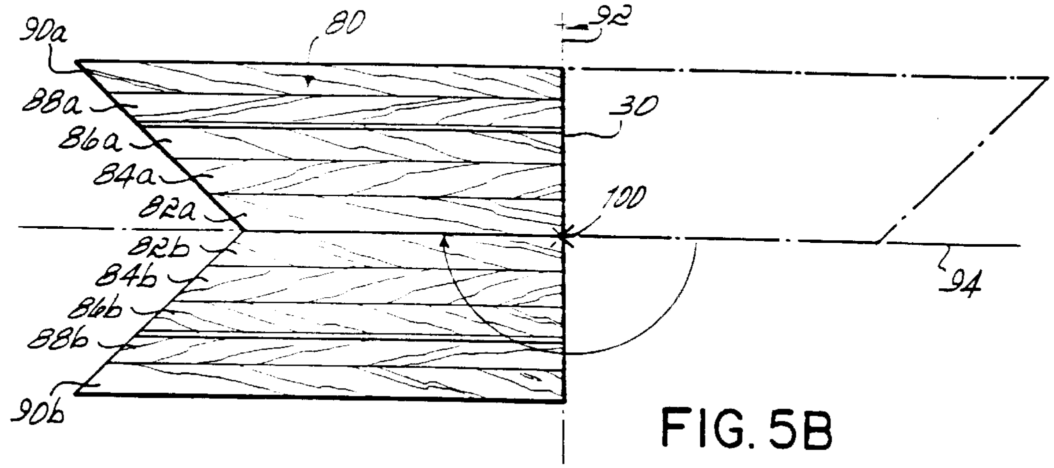
Figure 5C:
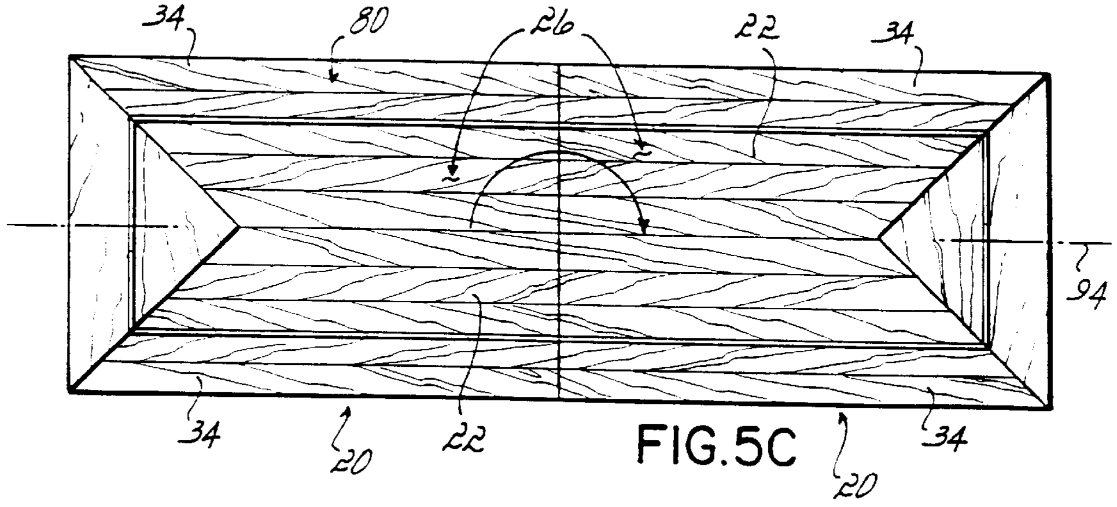

Referring to FIGS. 5A–5C, the wood grain pattern 80 formed in the underside 50 of the female portion 14 of the tooling 10 and applied to the lid 20 is illustrated. Referring first to FIG. 5A, the wood grain pattern from a plurality of "full length," i.e. the length of the head and foot end cap crowns combined, boards 82, 84 and 86 is illustrated, as are full length rim boards 88 and 90. Line 92 represents the mid-point along the boards 82, 84, 86, 88 and 90. Line 94 represents the longitudinal axis of symmetry of the lid(s) 20. It is desirable for the wood grain pattern of the lids 20 abutted header end-to-header end to be continuous, as this gives the visual impression that so-called full length boards have been used to construct the lids.

By rotating the wood grain pattern on the right hand side of the line 92 and above the line 94 clockwise 180° about an axis 100 which is perpendicular to the plane defined by the lid 20, which is located medially of the transverse extent of the lid 20 (i.e. is centered widthwise) and which is coincident with the header end edge 30 of the lid 20, the wood grain pattern illustrated in FIG. 5B is produced. In essence, the portions **82*b*, 84*b*, 86*b*, 88*b* and 90*b* of the boards 82, 84, 86, 88 and 90 are rotated clockwise around and towards the portions 82*a*, 84*a*, 86*a*, 88*a* and 90*a* such that the portions 82*b*, 84*b*, 86*b*, 88*b* and 90*b* are positioned on the left hand side of the line 92 and below the line 94. Thus, board portions 82*a*, 84*a*, 86*a*, 88*a* and 90*a* are positioned on one side of the longitudinal axis of symmetry 94, whereas board portions 82*b*, 84*b*, 86*b*, 88*b* and 90*b* are positioned on the other side of longitudinal axis of symmetry 94**.

Making two lids 20 with the tooling 10 thus produces two lids having the identical wood grain pattern 80 of FIG. 5B. Rotating the second such lid clockwise 180° (FIG. 5C) such that two such lids 20 are positioned header end-to-header end, i.e. as when positioned together atop a casket shell, produces a simulated wood grain pattern of the covers 26 and side rims 34 that matches and is continuous end-to-end thereby creating the visual impression that the crowns 22 and side rims 34 of the casket caps are fabricated of so-called "full length" boards, a feature which is more visually and aesthetically appealing than constructing the head and foot end caps of a casket out of non-full length boards.

Figure 6:
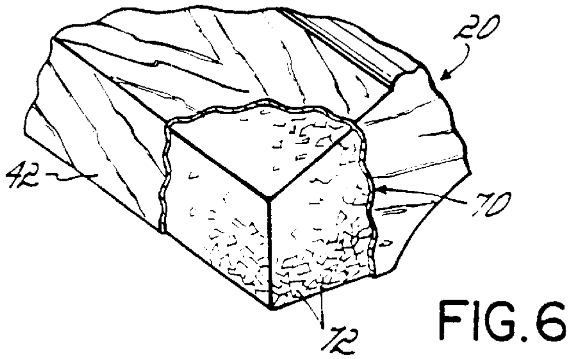
FIG. 6 is the encircled are 6 of FIG. 4, enlarged, with the resin impregnated tissue paper partially broken away.

Referring now to FIG. 6, the resin-impregnated tissue paper 42 is shown cut away at 70. As can be seen from the Figure, the paper 40 conceals the wood chips 72 in the wood chip and binder mixture 40. The paper 42 may be stained as desired to complete the wood finish look of the lid 20.

The invention thus provides a one-piece, unitary lid for a casket which includes a crown, a pie, a rim and header; separate fabrication and assembly of individual components are thus eliminated. The lid includes a decorative wood grain pattern applied thereto. The paper covering forming an outer skin of the lid conceals the wood chips in the material from which the lid is formed and may be attractively stained to further enhance the wood look. And, when two lids are placed end-to-end atop a casket shell the wood grain is continuous from the head end to the foot end of the lids thus presenting the appearance of lids fabricated from so-called full length boards.

Those skilled in the art will readily recognize numerous adaptations and modifications which can be made to the present invention which will result in an improved casket lid and method for making, yet all of which will fall within the spirit and scope of the present invention as defined in the following claims. For example, the method of this invention readily lends itself to fabricating lids for so-called full-couch caskets, i.e. caskets which have a single full-length lid rather than a pair of so-called split caps. In that case, the lid does not have a header on one end. Rather, the lid includes a full-length crown, a pie at each end of the crown, a pair of side rim members one of which is at each side of the crown and a pair of end rim members one of which is at each pie. Further, even though the material to be molded is described and illustrated as being applied to the male tool prior to molding the material, it is to be understood that the material could just as well be applied to the female tool instead, or be applied to both the male and female tools, prior to molding the material. In addition, fibrous materials other than those mentioned above may be utilized in the practice of the present invention; for example, plastic chips may be used. Further, wood veneer can be utilized as a covering for the molded cap. Still further, a thermal transfer layer, i.e. a sheet with ink printed thereon, could be used to place an ink pattern on the molded cap. Still further, a flange, such as an extruded plastic flange, could be attached to the cap for securing a dish assembly in the cap interior. Or alternatively a flange could be molded directly into the cap thus providing an integral means of securing the dish assembly within the cap. Thus, the invention shall embrace all such variations. Accordingly, the invention is to be limited only by the scope of the following claims and their equivalents.

What is claimed is:

1. A method of making a one-piece, unitary lid for a casket, comprising:

providing tooling configured to produce a one-piece, unitary casket lid having a crown, a pie, a rim and a header;

providing settable material from which to mold the lid;

molding the settable material with the tooling;

permitting the settable material to set thereby producing a one-piece, unitary casket lid having a crown, a pie, a rim and a header; and applying wood veneer to the molded lid.

2. The method of claim 1 wherein the settable material is comprised of wood chips and binder.

3. The method of claim 1 wherein the settable material is comprised of plastic chips and binder.

4. A method of making a one-piece, unitary lid for a casket, comprising:

providing tooling configured to produce a one-piece, unitary casket lid having a crown, a pie, a rim and a header, the tooling having a male portion and a female portion;

providing settable material from which to mold the lid;

applying the settable material onto one of the male and female portions of the tooling;

molding the settable material by compressing the settable material between the male and female portions of the tooling;

permitting the settable material to set thereby producing a one-piece, unitary casket lid having a crown, a pie, a rim and a header; and applying wood veneer to the molded lid.

5. The method of claim 4 wherein the settable material is comprised of wood chips and binder.

6. The method of claim 4 wherein the settable material is comprised of plastic chips and binder.

* * * * *